(12) United States Patent
Barrett

(10) Patent No.: US 8,266,907 B2
(45) Date of Patent: Sep. 18, 2012

(54) BESS (BARRETT ENERGY SIMPLE SYSTEM)

(76) Inventor: William F. Barrett, Wyncote, PA (US)

( * ) Notice: Subject to any disclaimer, the term of this patent is extended or adjusted under 35 U.S.C. 154(b) by 58 days.

(21) Appl. No.: 12/925,300

(22) Filed: Oct. 19, 2010

(65) Prior Publication Data

US 2012/0090322 A1    Apr. 19, 2012

(51) Int. Cl.
  *F03B 7/00*     (2006.01)
  *F03B 17/06*    (2006.01)
  *F03G 3/04*     (2006.01)
  *F04B 17/00*    (2006.01)

(52) U.S. Cl. ............... 60/640; 60/639; 417/329

(58) Field of Classification Search .......... 60/639, 60/640; 417/329; 415/916; 290/1 R
See application file for complete search history.

(56) References Cited

U.S. PATENT DOCUMENTS

| | | | | |
|---|---|---|---|---|
| 459,280 A | * | 9/1891 | Garrett, Jr. | 417/329 |
| 474,238 A | * | 5/1892 | Gardner | 60/640 |
| 1,260,204 A | * | 3/1918 | Keithly | 60/640 |
| 2,239,064 A | * | 4/1941 | Tower | 60/640 |
| 2,369,374 A | * | 2/1945 | Snyder | 60/639 |
| 2,499,715 A | * | 3/1950 | Blevins | 60/640 |
| 4,209,990 A | * | 7/1980 | Shelton, Jr. | 60/640 |
| 5,970,713 A | * | 10/1999 | Iorio | 60/640 |
| 6,445,078 B1 | * | 9/2002 | Cieslak, Jr. | 290/1 R |

* cited by examiner

*Primary Examiner* — Thomas E. Denion
*Assistant Examiner* — Christopher Jetton

(57) ABSTRACT

A bucket is filled with water from a water tray that has been filled with water from a water tank. The water tray signals the water tank when it needs water. When a bucket reaches a certain position, the unit bar tips the water tray and the bucket receives the tray's water. The weight of the filled bucket causes it to drop to the water sewer below. The bucket dumps the water into the sewer. The water is pumped from the sewer to the water tank. The two units are attached by a sprocket cable at the unit bar, and the cable travels over three pulley wheels. The units are separated by a rack. The units have a generator mounted on a unit bar. The movement of the bar and the motor along rack generates energy.

1 Claim, 2 Drawing Sheets

Flow Chart

**BESS
BARRETT ENERGY SIMPLE SYSTEM**

BESS (BARRETT ENERGY SIMPLE SYSTEM)

BACKGROUND

The use of water to generate energy seems limited to free falling water. This theory went to creating dams to accomplish the free fall. Soon after devises were established to generate energy from wind and solar sources.

Now my invention, BESS, is using gravity to cause motion in the form of a pulley system and contained falling water.

Recycled water, reclaimed buildings, and creation of another industry has formulated my thoughts for the Barrett Energy Simple System, BESS.

My search revealed that U.S. Pat. No. 6,445,078 has similarities and vast differences. The use of pulley sprocket and a spiked pole interfacing with mounted motors generate more power with less resources than U.S. Pat. No. 6,445,078.

SUMMARY

Gravity, generating energy, by interaction of two containers (buckets) that are connected by a pulley system. Buckets are filled with water from a water tray, fed from the system's water tank automatically. Support Poles that are pressure sensitive (by weight) release the buckets when they are full. The buckets drop to the system's sewer. Water buckets release the water into the sewer. The sewer water is pumped continuously back to the system's water tank.

Two generators, mounted on the bar that carries the water buckets, connects with a rack. The falling buckets cause the generator's action with the rack. A sprocket-type pulley cable turns the pulley wheels, which are attached to generators that generate energy. The action provided by the Barrett Energy Simple System results in five generators generating energy that can be sold to a utility.

LEGEND-REFERENCE TO FIG. 1

Figure 1:
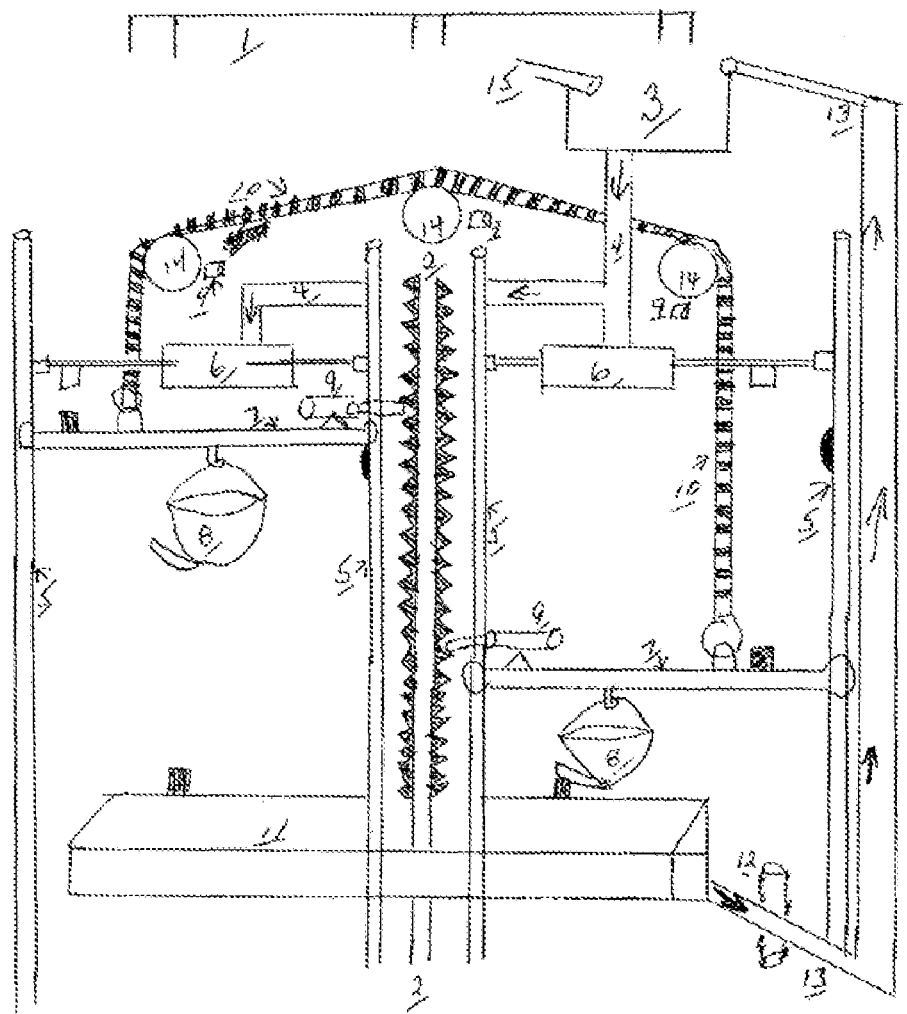
FIG. 1 is schematic drawing illustrating the apparatus of the present invention in front elevation.
Figure 2:
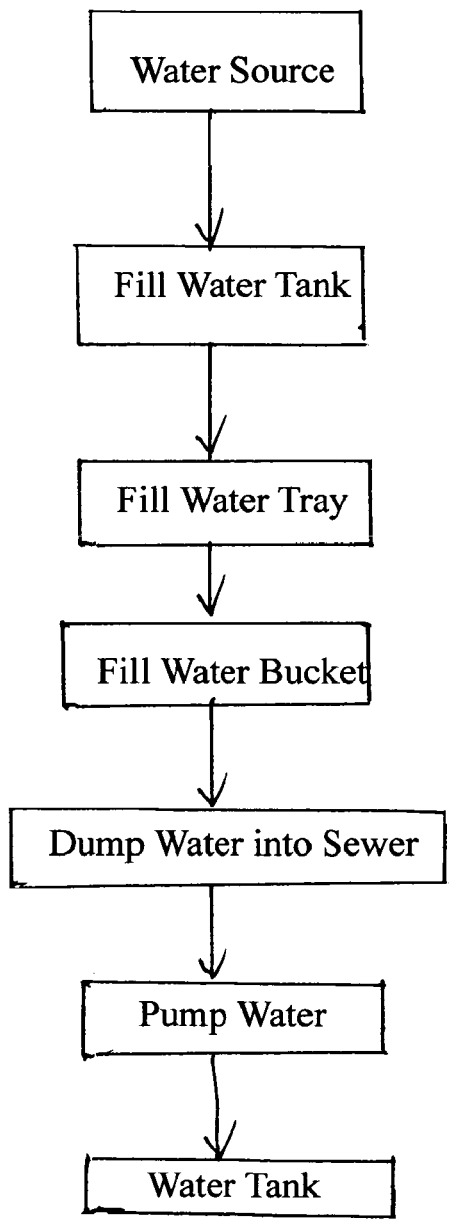
FIG. 2 is flow diagram of the operation of the present invention.

1—Overhead
2—Rack
3—Water Tank
4—Water line from Water Tank to Water Tray
5—Support Poles—Pressure Sensitive
6—Water Tray—Tilts When Prodded
7—Unit Bar
8—Water Bucket—Suspended
9—Generator Fly Wheel
10—Sprocket Pulley Cable
11—Water Sewer—Tilts Bucket
12—Water Pump
13—Pipeline through Pump from Sewer to Water Tank
14—Pulley Wheels
15—Water Source—As Needed

DESCRIPTION

The system has a structure that supports an overhead water tank and three platforms supporting three generators. These three generators react to the pulley wheels that front the platforms. The system is two units, side by side, that are separated by a rack. Each unit has two poles that support the units. The poles also keep a water tray at a fixed location within the unit. The poles are pressure sensitive. The water tray has a receptacle for a tripping device. The unit has a bar that is a catalysts for much of the happenings in the system. The "unit bar" has a latch on its upper side, and a generator mounted on the upper side close to the rack. The motor and the rack work together to generate energy. The unit bar has a tripping device that will tip the water tray.

On the underside of the unit bar is a hook on which a handle, attached to a water bucket, is hung. The two units are attached by a sprocket cable at the unit bar latch. The sprocket cable passes over the pulley wheels which are receptive to the sprocket design. An energy generator is attached to each of the pulley wheels.

The water tank is filled initially from an outside source. The water tank is filled until a flow master float cuts off the flow.

A water line from the water tank carries water to the water tray. The flow is cut off by a flow master float.

A tripping device mounted on the unit bar reaches the tripping device receptacle and the water tray is dumped into the waiting bucket. The pressure sensitive pole will release the unit bar when the water bucket has been filled. The water bucket is designed to empty when it reaches the water sewer.

The water pump sends the water through a pipe line to the water tank from the water sewer. When the bucket is empty in one unit the other unit's bucket is full. One will rise while the other falls.

The invention claimed is:
1. An energy conversion system comprising:
a water tank filled with water;
a pair of water trays positioned below the water tank, and connected to receive water from said water tank, each water tray including a rotatable shaft supporting the water tray;
a pair of unit bars, one positioned under each of the water trays, each unit bar comprising:
a water bucket suspended below the unit bar and positioned to receive water released from the water trays when tilted,
a generator attached at one end of each unit bar, and including a ratchet, and
a first position and a second position;
a cable connecting each of the unit bars, the cable engaged with a plurality of pulleys positioned above the water trays;
a vertical rack positioned so that one water tray and one unit bar are on one side of the rack and the other water tray and other unit bar are on the other side, and each generator ratchet is engaged with the rack; and
a water sewer positioned below the unit bars and water buckets;
wherein the first position is at a water tray and the second position is at the water sewer, the cable and pulleys allow the unit bars to alternate between their first and second positions, and at the first position the water buckets fill with water from the water tray and at the second position the water buckets release water to the sewer.

* * * * *